United States Patent [19]

Weymans et al.

[11] Patent Number: 4,954,569

[45] Date of Patent: Sep. 4, 1990

[54] USE OF HOMOPOLYCARBONATES OF 3,3'-DIHYDROXYDIPHENYL ETHER FOR MODIFYING FILMS OF THERMOPLASTICS

[76] Inventors: Günther Weymans, Bayer Aktiengesellschaft, D-5090 Leverkusen; Klaus Berg, Bayer Aktiengesellschaft, D-4150 Krefeld-Uerdingen; Ulrich Grigo, Bayer Aktiengesellschaft, D-4150 Krefeld-Uerdingen; Karsten-Josef Idel, Bayer Aktiengesellschaft, D-4150 Krefeld-Uerdingen; Ludwig Bottenbruch, Woehlerstrasse 5, D-4150 Krefeld, all of Fed. Rep. of Germany

[21] Appl. No.: 371,086

[22] Filed: Jun. 26, 1989

[30] Foreign Application Priority Data

Jul. 9, 1988 [DE] Fed. Rep. of Germany ....... 3823306

[51] Int. Cl.$^5$ ............................................. C08L 69/00

[52] U.S. Cl. ..................... 525/146; 525/148; 525/394; 525/433; 525/439; 525/462; 525/535; 525/537

[58] Field of Search ............... 525/439, 462, 394, 146, 525/148, 433, 535, 537; 528/196

[56] References Cited

U.S. PATENT DOCUMENTS

| | | | |
|---|---|---|---|
| 3,221,080 | 11/1965 | Fox ...................................... | 525/394 |
| 4,485,219 | 11/1984 | Falk et al. ............................ | 525/394 |
| 4,506,067 | 3/1985 | Burzminski ........................ | 528/196 |

*Primary Examiner*—Theodore E. Pertilla

[57] ABSTRACT

The invention relates to the use of thermoplastic homopolycarbonates of 3,3'-dihydroxydiphenyl ether in quantities of 3% by weight to 30% by weight for modifying filsm of other thermoplastics than the thermoplastic homopolycarbonates of 3,3'-dihydroxydiphenyl ether, to a process for modifying films of these other thermoplastics, to the films obtainable by this process and to mixtures containing the homopolycarbonates mentioned and the other thermoplastics.

12 Claims, No Drawings

USE OF HOMOPOLYCARBONATES OF 3,3'-DIHYDROXYDIPHENYL ETHER FOR MODIFYING FILMS OF THERMOPLASTICS

This invention relates to the use of thermoplastic homopolycarbonates of 3,3'-dihydroxydiphenyl ether in quantities of from 3% by weight to 30% by weight, preferably in quantities of from 5% by weight to 25% by weight and more preferably in quantities of from 8% by weight to 20% by weight, based on the total weight of thermoplastics, for modifying films of other thermoplastics than the thermoplastic homopolycarbonates of 3,3'-dihydroxydiphenyl ether.

The present invention also relates to a process for modifying films of these other thermoplastics which is characterized in that these other thermoplastics are thoroughly mixed in known manner with thermoplastic homopolycarbonates of 3,3'-dihydroxydiphenyl ether in quantities of from 3% by weight to 30% by weight, preferably in quantities of from 5% by weight to 25% by weight and more preferably in quantities of from 8% by weight to 20% by weight, based on the total weight of thermoplastics, i.e. on the total weight of thermoplastic homopolycarbonates of 3,3'-dihydroxydiphenyl ether and other thermoplastics and the resulting mixture is subsequently processed in known manner to form films.

The present invention also relates to the films obtainable by the process according to the invention.

The invention also relates to mixtures containing from 3% by weight to 30% by weight, preferably from 5% by weight to 25% by weight and more preferably from 8% by weight to 20% by weight of thermoplastic homopolycarbonates of 3,3'-dihydroxydiphenyl ether and 97% by weight to 70% by weight, preferably from 95% by weight to 75% by weight and more preferably from 92% by weight to 80% by weight of other thermoplastics than the thermoplastic homopolycarbonates of 3,3'-dihydroxydiphenyl ether.

Homopolycarbonates of 3,3'-dihydroxydiphenyl ether are known (cf. for example Journal of Polymer Science, Part A: Polymer Chemistry, Vol. 25, pages 3413 to 3422 (1987) and CRD, Corporate Research and Development, Schenectady, N.Y., "Recent Advances in Polycarbonate Photodegradation" by A. Factor, W. V. Ligon, R. J. May and F. H. Greenberg, Department of Chemistry, Buffalo State College, Buffalo, N.Y., General Electric).

Films of these homopolycarbonates are not known from the literature. Other thermoplastics in the context of the invention are other thermoplastic polycarbonates based on diphenols corresponding to formula (I)

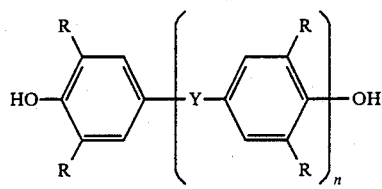

(I)

in which
n=0 or 1 and
Y is a single bond, an alkylene or alkylidene radical containing from 1 to 7 C atoms, a cycloalkylene or cycloalkylidene radical containing from 5 to 12 C atoms, —O—, —S—,

, —SO$_2$—or

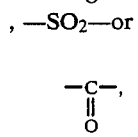

,
and
R=H or CH$_3$.

Thermoplastic polycarbonates such as these are known from the literature or may be produced by methods known from the literature. The same applies to the diphenols corresponding to formula (I).

Examples of diphenols are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones and α,α'-bis-(hydroxyphenyl)-diisopropyl benzenes and nucleus-methylated compounds thereof.

Preferred diphenols of formula (I) are 2,2-bis-(4-hydroxyphenyl)-propane (bisphenol A), 2,2-bis-(4-hydroxy-3,5-dimethylphenyl)-propane (tetramethyl bisphenol A), 2,4-bis-(4-hydroxyphenyl)-2-methylbutane, 1,1-bis-(4-hydroxy-phenyl)-cyclohexane, 4,4'-dihydroxydiphenyl sulfide, 4,4'-dihydroxydiphenyl and 4,4'-dihydroxydiphenyl sulfone.

Bisphenol A is particularly preferred. Mixtures of the diphenols mentioned may also be used for the production of the polycarbonates.

Accordingly, the polycarbonates based on the diphenols corresponding to formula (I) are both homopolycarbonates and also copolycarbonates; they may be both linear and branched.

The molecular weights $\overline{M}w$ (weight average molecular weight, as determined by gel permeation chromatography in tetrahydrofuran) of the polycarbonates based on the diphenols corresponding to formula (I) are in the range from 10,000 g/mol to 300,000 g/mol and preferably in the range from 12,000 g/mol to 150,000 g/mol.

Other thermoplastics in the context of the invention are also aromatic polyester carbonates based on diphenols, terephthalic and/or isophthalic acid, phosgene, chain terminators and, optionally, branching agents, which have relative solution viscosities of from 1.18 to 2.0 and more preferably from 1.2 to 1.5 (as measured in a solution of 0.5 g polyester carbonate in 100 ml CH$_2$Cl$_2$ solution at 25° C.) and in which the ratio of carbonate structures to aromatic dicarboxylic acid ester structures is preferably from 10 mol-%:90 mol-% to 40 mol-%:60 mol-%, based on the total mols of carbonate and dicarboxylic acid ester structures.

The aromatic polyester carbonates and their production are known from the literature (cf. for example EP-OS No. 0 036 080 (Le A 20 203-EP)). Preferred diphenols for their production are those corresponding to formula (I), in which R=H.

Other thermoplastics are also aliphatic thermoplastic polyesters, i.e. preferably polyalkylene glycol terephthalates. Polyalkylene terephthalates in the context of the present invention are, for example, those based on ethylene glycol, propane-1,3-diol, butane-1,4-diol, hexane-1,6-diol and 1,4-bis-hydroxymethyl cyclohexane.

The molecular weights ($\overline{M}_w$) of these polyalkylene glycol terephthalates are in the range from 10,000 to 80,000 g/mol. The polyalkylene glycol terephthalates may be obtained by transesterification in known manner, for example from terephthalic acid dialkyl ester and the corresponding diol (cf. for example US-PS No. 2,647,885; 2,643,989; 2,534,028; 2,578,660; 2,742,494 and 2,901,466).

For example, a lower alkyl ester of terephthalic acid, preferably the dimethyl ester, is transesterified with an excess of diol in the presence of suitable catalysts to form the bishydroxyalkyl ester of terephthalic acid. The temperature is increased from 140° C. to 210–220° C. The alcohol released is distilled off. Condensation is then carried out at temperatures in the range from 210 to 280° C., the pressure being reduced in stages to less than 1 Torr and the excess diol being distilled off.

Accordingly, the aliphatic, thermoplastic polyesters suitable for use in accordance with the invention are known from the literature or may be obtained by methods known from the literature.

Other thermoplastics suitable for use in accordance with the invention are thermoplastic polyamides. Suitable polyamides are, for example, nylon-6,6 prepared by condensation of hexamethylene diamine and adipic acid; nylon-6,10 prepared from hexamethylene diamine and sebacic acid; polymers of ε-amino caproic acid or ε-caprolactam, so-called nylon-6; polyamide 11, the self-condensation product of 11-aminoundecanoic acid; copolymers of hexamethylene diamine, ε-caprolactam, adipic acid and sebacic acid; copolymers of hexamethylene diamine and adipic acid modified with formaldehyde and methanol; polyamides prepared by reaction of a linear diamine with dimeric acids which have been obtained from isobutylene dimers and also polyamides prepared from polymeric unsaturated fatty acids and various polyamines.

All the polyamides suitable for use in accordance with the invention should contain the

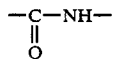

group as bridge member in the main chain and should have average molecular weights ($\overline{M}w$, as determined by gel chromatography in m-kresol) in the range from 1,000 to 100,000 g/mol (cf. for example US-P No. 3,431,224, column 3, lines 58–73).

Accordingly, the thermoplastic polyamides suitable for use in accordance with the invention are known from the literature or may be obtained by methods known from the literature.

Other thermoplastics suitable for use in accordance with the invention are also so-called LC polymers. LC polymers are polymers which are capable of forming liquid crystalline melts. Polymers such as these, which are also known as "thermotropic", are sufficiently well-known (cf. for example EP-OS No. 0 131 846, EP-OS No. 0 132 637 and EP-OS No. 0 134 959).

The literature references cited above mention further literature and, in addition, describe the determination of the liquid crystalline state of polymer melts.

LC polymers are, for example, aromatic polyesters based on optionally substituted p-hydroxybenzoic acid, optionally substituted isophthalic and/or terephthalic acid, 2,7-dihydroxynaphthalene and other diphenols (EP-OS No. 0 131 846), aromatic polyesters based on optionally substituted p-hydroxybenzoic acid, diphenols, carbonic acid and optionally aromatic dicarboxylic acids (EP-OS No. 0 132 637 and aromatic polyesters based on optionally substituted p-hydroxybenzoic acid, 3-chloro-4-hydroxybenzoic acid, isophthalic acid, hydroquinone and 3,4'- and/or 4,4'-dihydroxybiphenyl, 3,4'- and/or 4,4'-dihydroxydiphenyl ether and/or 3,4'- and/or 4,4'dihydroxydiphenyl sulfides (EP-OS No. 0 134 959).

Other thermoplastics suitable for use in accordance with the invention are also thermoplastic poly-$C_1$-$C_4$-alkyl methacrylates, i.e. polymers of

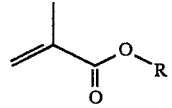

in which R=$C_1$-$C_4$ alkyl.

Suitable polymers are those of methyl, ethyl, propyl or butyl methacrylate, preferably of methyl or ethyl methacrylate. They are understood to include both homopolymers and copolymers of these methacrylates. In addition, up to at most 9.5% by weight of other ethylenically unsaturated, copolymerizable monomers, based on the total weight of these unsaturated monomers and the methacrylates, may be copolymerized so that the $C_1$-$C_4$ alkyl methacrylate polymers suitable for use in accordance with the invention are made up of 90.5% by weight to 100% by weight of alkyl methacrylate units and of 9.5% by weight to 0% by weight of other ethylenically unsaturated monomer units.

Other ethylenically unsaturated, copolymerizable monomers are, for example, (meth)acrylonitrile, (α-methyl) styrene, bromostyrene, vinyl acetate, $C_1$-$C_8$ alkyl acrylates, aryl (meth)acrylates, (meth)acrylic acid, ethylene, propylene, N-vinyl pyrrolidone, vinyl sulfonic acid (salts) or styrene sulfonic acid (salts).

The polymethacrylates suitable for use in accordance with the invention are soluble in certain organic solvents and thus have a linear or branched structure.

The polymethacrylates suitable for use in accordance with the invention may be prepared by known polymerization processes, but preferably by radical or thermal polymerization. Suitable polymerization processes are emulsion, bulk, suspension and dispersion polymerization, more especially emulsion polymerization, but preferably bulk or solution polymerization. The molecular weights of the polymethacrylates may be varied within wide limits by known process-related measures, for example by using mercaptans as regulators. The polymethacrylates suitable for use in accordance with the invention normally have molecular weights (or intrinsic viscosities or melt viscosities) which enable them to be processed as thermoplastics by injection molding or extrusion.

The thermoplastic poly-$C_1$-$C_4$ -alkyl methacrylates suitable for use in accordance with the invention are thus known from the literature or may be obtained by methods known from the literature.

Other suitable thermoplastics for use in accordance with the invention are thermoplastic linear and branched polyarylene sulfides. They have structural units corresponding to the following general formula

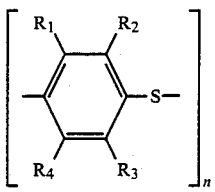

in which $R_1$ to $R_4$ independently of one another may be the same or different and represent $C_1$–$C_6$ alkyl, phenyl or hydrogen. The polyarylene sulfides may also contain diphenyl units.

Polyarylene sulfides and their production are known (cf. for example US-P No. 3,354,129 and EP-OS No. 0 171 021 and the literature cited in EP-OS No. 0 171 021).

Other thermoplastics suitable for use in accordance with the invention are thermoplastic polyarylene sulfones.

Suitable polyarylene sulfones in the context of the invention have average weight average molecular weights $\overline{M}w$ (as measured by the light scattering method in $CHCl_3$) in the range from 1,000 to 200,000 g/mol and preferably in the range from 20,000 to 60,000 g/mol. Examples include the polyarylene sulfones obtainable by known methods from 4,4'-dichlorodiphenyl sulfone and a bisphenol, more especially 2,2-bis-(4-hydroxyphenyl)-propane, with average weight average molecular weights ($\overline{M}w$) in the range from 2,000 to 200,000 g/mol.

Polyarylene sulfones such as these are known from the literature (cf. for example US-P No. 3,264,536, DE-AS No. 1 794 171, GB-P No. 1,264,900, US-P No. 3,641,207, EP-A-No. 0 038 028, DE-OS No. 36 01 419 and DE-OS No. 36 01 420).

The suitable polyarylene sulfones may also be branched in known manner (cf. for example DE-OS No. 23 05 413).

Other thermoplastics suitable for use in accordance with the invention are also thermoplastic polyphenylene oxides, preferably poly-(2,6-dialkyl-1,4-phenylene oxides). Polyphenylene oxides suitable for the purposes of the invention have weight average molecular weights $\overline{M}w$ (as measured by the light scattering method in chloroform) in the range from 2,000 to 100,000 g/mol and preferably in the range from 20,000 to 60,000 g/mol. Polyphenylene oxides such as these are known from the literature or may be obtained by methods known from the literature.

The preferred poly-(2,6-dialkyl-1,4-phenylene oxides) may be produced in known manner by oxidizing condensation of 2,6-dialkyl phenols with oxygen in the presence of catalyst combinations of copper salts and tertiary amines (cf. for example DE-OS No. 21 26 434 and US-P No. 3,306,875).

Suitable poly-(2,6-dialkyl-1,4-phenylene oxides) are, in particular, the poly-[2,6-di-($C_1$–$C_4$-alkyl)-1,4-phenylene oxides], such as for example poly-(2,6-dimethyl-1,4-phenylene oxide).

Suitable 2,6-dialkylphenols are in particular those containing $C_1$–$C_4$ alkyl substituents such as, for example, 2,6-dimethyl phenol, 2-methyl-6-ethyl phenol, 2,6-diethyl phenol, 2-ethyl-6-n-propyl phenol, 2-methyl-6-isopropyl phenol, 2-methyl-6-n-propyl phenol, 2-methyl-6-butyl phenol and 2,6-di-n-propyl phenol.

Suitable catalyst combinations are, in particular copper(I) chloride and triethylamine, copper(I) sulfate and tributylamine, copper(I) acetate and N-methyl morpholine and copper(I) chloride and pyridine.

One suitable method for the production of poly-(2,6-dialkyl-1,4-phenylene oxides) is carried out as follows, for example using copper(I) chloride/pyridine as the catalyst combination in accordance with DT-OS No. 2 126 434:

A 2,6-dialkyl phenol is dissolved in a mixture of n-butanol/toluene and the resulting solution is condensed under oxidizing/dehydrogenating conditions in the presence of oxygen and in the presence of the copper(I) chloride/pyridine complex. The polyphenylene oxide precipitated is then dissolved in and reprecipitated from chloroform/methanol.

Other thermoplastics suitable for use in accordance with the invention are also thermoplastic copolymers of styrene and/or α-methyl styrene with acrylonitrile and/or with methacrylonitrile, generally 50 to 95 parts by weight styrene and/or α-methyl styrene and 50 to 5 parts by weight acrylonitrile and/or methacrylonitrile, based in each case on 100 parts by weight copolymer, being incorporated by polymerization in the thermoplastic copolymers.

Preferred ratios by weight in the copolymer are 60 to 80 parts by weight styrene and/or α-methyl styrene to 40 to 20 parts acrylonitrile and/or methacrylonitrile.

Thermoplastic copolymers of the type in question are known and may be produced by radical polymerization, more especially by emulsion, suspension, solution or bulk polymerization. The copolymers preferably have molecular weights $\overline{M}w$ (weight average, as determined by light scattering or sedimentation) in the range from 15,000 to 200,000 g/mol.

Films in the context of the invention are those having a thickness in the range from 1 μm to 500 μm and more especially in the range from 10 μm to 300 μm.

The films modified in accordance with the invention have very good barrier properties with respect to gases, including for example oxygen, nitrogen and carbon dioxide, even for film thicknesses of 10 μm. On the other hand, the films modified in accordance with the invention show favorable properties, particularly mechanical and processing properties, which may readily be influenced within desired limits through the choice of the other thermoplastic. The barrier properties were determined as follows:

The films free as far as possible from defect structures and solvent are stored in vacuo for 2 days and any gases still dissolved in the polymer are thus extracted. Small pieces of film are then bonded into an aluminium template at room temperature/0% relative humidity using pressure measuring capacitors as detector. The effective measuring surface is approximately 1.8 cm². The thickness of the film is measured by micrometer gauge. Permeability is determined after a measuring time of 20 h from the throughput of the corresponding gas through the film.

The permeability of plastics films to gases and vapors has been investigated (cf. for example "Kolloid Zeitschrift", Vol. 167, November/December 1959, pages 55 to 62), including that of polycarbonate films (cf. also H. Schnell, "Linear Aromatic Polyesters of Carbonic Acid", Industrial and Engineering Chemistry, Vol. 51, No. 2, February 1959, pages 157 to 160).

A special process for the production of thin, non-porous polycarbonate films is known from DE-OS No. 2

248 817 (Le A 14 667), this process being particularly suitable for polycarbonates of 2,2-bis-(3,5-dimethyl-4-hydroxyphenyl)-propane.

Membranes of special polyimides, polyesters and polyamides are described in U.S. Pat. No. 3,822,202. The selective permeability of these membranes to various gases is improved by heat treatment during the production of these membranes.

Polycarbonates of halogenated diphenols combining improved flame resistance with good barrier properties to water vapor and gases are known from US-P No. 4,195,157.

Polycarbonates of alkylated diphenols which are said to show improved barrier properties to water vapor and gases are known from US-P No. 4,304,899.

Semipermeable polycarbonate membranes in which the polycarbonates are produced mainly from tetrahalogenated diphenols are known from EP-A-No. 0 242 147.

EP-A-No. 0 244 126 describes membranes of polyester carbonates based on tetrabromodiphenols. The membranes are suitable for the separation of gases.

US-P No. 4,142,021 describes laminates having excellent barrier properties to oxygen and water vapor.

The permeability to gases of mixtures of bisphenol-A-polycarbonates and copolyesters synthesized from 1,4-cyclohexane dimethanol and mixtures of terephthalic acid and isophthalic acid is investigated in "Journal of Applied Polymer Science", Vol. 29, pages 845 to 852, 1984).

The absorption and transport of gases in substituted polycarbonates is investigated in "Journal of Polymer Science, Part B, Polymer Physics", Vol. 25, pages 1999 to 2026, bisphenol-A-polycarbonate being used for comparison.

In Applicants' view the subject of the present invention is neither anticipated by nor implicit in the cited prior art.

The relative viscosity of the homopolycarbonates of 3,3'-dihydroxydiphenyl ethers used in accordance with the invention is in the range from 1.05 to 1.95, preferably in the range from 1.10 to 1.4 and more preferably in the range from 1.15 to 1.3 (as measured at 25° C. in $CH_2Cl_2$ and at a concentration of 0.5 g polycarbonate in 100 ml $CH_2Cl_2$).

Independently of this, the weight average molecular weights $\overline{M}w$ (as measured by gel permeation chromatography) may be in the range from 10,000 g/mol to 300,000 g/mol, preferably in the range from 12,000 g/mol to 200,000 g/mol and more preferably in the range from 17,000 g/mol to 80,000 g/mol.

The non-uniformities $$U = \frac{Mw}{Mn} - 1$$

of the homopolycarbonates of 3,3'-dihydroxydiphenyl ether to be used in accordance with the invention should be between 0.3 and 10, preferably between 0.4 and 8 and more preferably between 0.8 and 5. Mn was also measured by gel permeation chromatography.

The homopolycarbonates to be used in accordance with the invention may be used either individually or in admixture. In this connection, it is also of advantage for example to mix mixtures of relatively low molecular weight homopolycarbonates having relative viscosities of from about 1.05 to 1.2 with relatively high molecular weight homopolycarbonates having relative viscosities of from 1.5 to 2.5, provided that the relative viscosities of the mixtures are again in the range from 1.05 to 1.95, preferably in the range from 1.10 to 1.40 and more preferably in the range from 1.15 to 1.30.

Monofunctional compounds, such as monophenols, are used in known manner as chain terminators for establishinq the molecular weights of the homopolycarbonates of 3,3'-dihydroxydiphenyl ether, being used in known manner and in known quantities in the synthesis of the homopolycarbonates.

The homopolycarbonates of 3,3'-dihydroxydiphenyl ether are mixed with the other thermoplastics, for example, in known processing machines for polymers, such as screw or piston machines, or in processing machines having rotating elements, such as mixers or kneaders. Particularly suitable processing machines are screw injection molding machines, single-screw or twin-screw extruders, planetary roll extruders, processing machines having rotating chambers which are capable of generating high apparent shear rates of from 10 to 1,000 $sec^{-1}$ between the rotating elements.

The polymers may also be mixed in common solvents and the solvents may be removed in known manner after mixing. One example of a suitable solvent, which of course is also determined by the type of the other thermoplastic added, is $CH_2Cl_2$.

Additives typically used for the individual components, such as organic and inorganic fillers or reinforcing materials and also oligomeric compounds, preferably silicon-containing fillers and/or reinforcing materials, such as glass fibers, fibers of other thermoplastics and/or carbon fibers, may be added before, during or after mixing of the homopolycarbonates with the other thermoplastics.

The films according to the invention are produced from the mixtures according to the invention, for example, by extrusion or by the known film blowing process. It is also possible to spread solutions of the mixtures over liquids, which are non-solvents for the mixtures and their solvents, and thus to produce non-porous films by evaporation of the solvents; after film formation, the base liquid may be evaporated or the film may be lifted off the base liquid in known manner. The films may also be produced by the processes described in EP-OS No. 0 242 147.

The films according to the invention are used in the form of membranes, hollow films or flat films for any applications requiring good barrier properties. Accordingly, the films may be used, for example, as additive films for boil-proof and ovenproof packs. The films may also be used together with microwave packs of polysulfones, polyether imides or a crystallized polyester as improved packaging materials and moldings for microwave ovenware. Plastic bottles of multilayer films containing the films according to the invention show improved barrier behavior and are therefore suitable for the storage of liquids containing $CO_2$. The films may also be used as a packaging material for foods.

Accordingly, the films according to the invention may also be used in combination with other known films of thermoplastics, for example in combination with films of bisphenol-A-hompolycarbonates or with films of copolycarbonates of 2,2-bis-(4-hydroxyphenyl)-propane and 1,1-bis-(4-hydroxyphenyl)-cyclohexane. Composite films such as these are used in particular in the packaging field, for example in the packaging of foods, in the production of barrier-protected $CO_2$-containing liquids and in gas separation membranes.

EXAMPLES

EXAMPLE A

A homopolycarbonate based on the bisphenol corresponding to formula (Ia)

$$HO-\phenyl-\underset{\underset{CH_2-CH_2-CH_3}{|}}{\overset{\overset{CH_3}{|}}{C}}-\phenyl-OH \qquad (Ia)$$

was prepared by the interfacial process described in H. Schnell "Chemistry and Physics of Polycarbonates", Polymer Reviews, Vol. 9, pages 33 et seq, Interscience Publ. (1964). It had a relative viscosity of 1.27, as measured in methylene chloride (c=5 g/l) at 25° C., and a weight average molecular weight of 36,300 g/mol for a number average of 16,500 g/mol as determined by gel permeation chromatography. The glass temperature, as measured at a heating rate of 20 K/min by the DSC method, was 102° C., the density measured at room temperature was 1.1318 g/cm³ and the yield point, as measured in a slow tensile test (crosshead speed 2 mm/minute), was 42 MPa.

Permeability to oxygen was determined on a 2.14 mm thick flat film of this material. The film was made by press molding after 5 minutes' tempering at 150° C. under a pressure of 200 bar and was then treated in vacuo for 48 h at 80° C.

The permeation measurements were performed after the test specimens had been stored in vacuo for 2 days at a storage temperature of 23° C. After a measuring time of 20 h, permeation was measured from the particular gas throughput. The measuring temperature was 23° C. and the relative air humidity 0%.

Pressure measuring capacitors were used as detectors in the permeation measurement. The permeability of $O_2$, as measured in units of $$\frac{cm^3 \times mm}{m^2 \times 24h} \times 10^5 \text{ Pa},$$

, was 121.8.

EXAMPLE B

A homopolycarbonate based on the diphenol corresponding to formula (Ib)

$$HO-\phenyl-\text{cyclobutyl}-\phenyl-OH \qquad (Ib)$$

was prepared by the general method mentioned in Example (a). The physical data are measured as described in Example (a) and are as follows: relative viscosity 1.2, $\overline{M}w$ 25,300, $\overline{M}n$ 13,200, glass temperature 167° C., density 1.2051 g/cm³ and yield point 60 MPa.

Permeation for $O_2$ was measured on a 140 μ thick flat film produced as described in Example (a) (but press-molded at a temperature of 220° C.):

$$22.0 \frac{cm^3 \times mm}{m^2 \times 24h} \times 10^5 \text{ Pa}.$$

EXAMPLE C

A homopolycarbonate based on the diphenol corresponding to formula (Ic)

$$HO-\underset{\underset{CH_3}{|}}{\overset{\overset{CH_3}{|}}{\phenyl}}-\underset{\underset{CH_3}{|}}{\overset{\overset{CH_3}{|}}{C}}-\underset{\underset{CH_3}{|}}{\overset{\overset{CH_3}{|}}{\phenyl}}-OH \qquad (Ic)$$

was prepared as in Example (a) and the following physical data measured as described in Example (a): relative viscosity 1.29, $\overline{M}w$ 39,300, $\overline{M}n$ 15,700, glass temperature 197° C., density 1.0861 g/cm³ and strength 36 MPa.

Permeation for $O_2$ was measured on a 100 μ thick flat film produced as in Example (a) (but press-molded at 280° C.):

$$559.0 \frac{cm^3 \times mm}{m^2 \times 24h} \times 10^5 \text{ Pa}.$$

EXAMPLE D

A homopolycarbonate based on the diphenol corresponding to formula (Id)

$$HO-\phenyl-\underset{\underset{CH_3}{|}}{\overset{\overset{CH_3}{|}}{C}}-\phenyl-OH \qquad (Id)$$

was prepared as in Example (a) and the following physical data determined as described in Example (a): relative viscosity 1.2, $\overline{M}w$ 19,200, $\overline{M}n$ 10,000, glass temperature 139° C., density 1.1888 g/cm³ and yield point 62 MPa.

The permeation for $O_2$ was measured on corresponding flat films:

$$87.1 \frac{cm^3 \times mm}{m^2 \times 24h} \times 10^5 \text{ Pa}.$$

EXAMPLE E

A homopolycarbonate based on 3,3'-dihydroxydiphenyl ether was prepared as in Example (a). It had a relative viscosity of 1.195, a density—in the solid—of 1.332 g/cm³, a molecular non-uniformity of 3.5 and was not crystalline. These physical data were measured as in Example (a).

In Examples 1 to 4 below, polycarbonates of Examples (a) to (d) were mixed in known manner with the polycarbonate of Example (e) and films according to the invention produced from the resulting mixtures:

EXAMPLE 1

150 g Polycarbonate of Example (e) were mixed with 850 g polycarbonate of Example (a) at 220° C. in a standard machine and a 0.5 mm thick film press-molded from the resulting mixture. The permeability of $O_2$ was 63 units. The yield point measured 50 MPa. The film was produced and its properties measured in the same way as in Example (a).

EXAMPLE 2

100 g Polycarbonate of Example (e) were mixed with 900 g polycarbonate of Example (b) in the same way as in Example 1, but at 290° C. The film was 0.431 mm thick. The permeability of $O_2$ was only 11 units. The yield point was 67 MPa. The film was produced and its properties measured in the same way as in Example (b).

EXAMPLE 3

150 g Polycarbonate of Example (e) were mixed with 850 g polycarbonate of Example (c) in the same way as described in Example 1, but at 330° C. The film was 0.51 mm thick and was relatively tough. An $O_2$ permeability of 45 units was measured. The yield point was 45 MPa. The film was produced and its properties measured in the same way as in Example (c).

EXAMPLE 4

30 g of the polycarbonate of Example (e) were mixed with 70 g of the polycarbonate of Example (d) in the same way as described in Example 1, but at 320° C. An $O_2$ permeability of 15.3 units was measured on the 0.32 mm thick film. The yield point was 52 MPa.

The film was produced and its properties measured in the same way as in Example (d).

What is claimed:

1. Films of thermoplastics modified by the addition of 3% to 30% by weight of thermoplastic homopolycarbonates of 3, 3'-dihydroxydiphenyl ether, the thermoplastics being selected from: polycarbonates based on diphenols, excepting homopolycarbonates of 3,3'-dihydroxyphenyl ether; aromatic polyester carbonates; aliphatic polyesters; polyamides; thermotropic polymers; homopolymers or copolymers of poly-$C_1$-$C_4$-alkyl methacrylates; linear and branched polyarylene sulfides; polyarylene sulfones; polyphenylene oxides and; copolymers of styrene or styrene and methyl styrene with acrylonitrite or acrylonitrile and methacrylonitrile.

2. A mixture of thermoplastics comprising 3% to 30% by weight of thermoplastic homopolycarbonates of 3,3'-dihydroxydiphenyl ether, and 70% to 97% by weight of a thermoplastic selected from: polycarbonates based on diphenols excepting homopolycarbonates of 3,3'-dihydroxyphenyl ether; aromatic polyester carbonates; aliphatic polyesters; polyamides; thermotropic polymers; poly—Cl-$C_4$—alkyl methacrylates; linear and branched polyarylene sulfides; polyarylene sulfones; polyphenylene oxides, and; copolymers of styrene or styrene and methyl styrene with acrylonitrile or acrylonitrile and methacrylonitrile.

3. A mixture of thermoplastics as claimed in claim 2 wherein the thermoplastic is a homopolycarbonate based on a diphenol.

4. A mixture of thermoplastics as claimed in claim 3 wherein the thermoplastic is a homopolycarbonate based on a bisphenol of the formula:

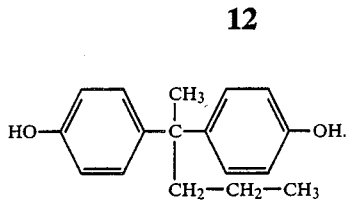

5. The mixture of thermoplastics as claimed in claim 3 wherein the thermoplastic is a homopolycarbonate based on a diphenol of the formula:

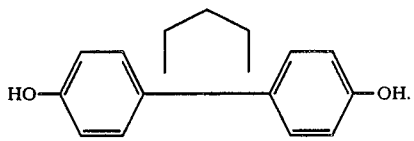

6. A mixture of thermoplastics as claimed in claim 3 wherein the thermoplastic is a homopolycarbonate based on a diphenol of the formula:

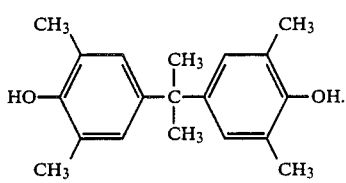

7. A mixture of thermoplastics as claimed in claim 3 wherein the thermoplastic is a homopolycarbonate based on a diphenol of the formula:

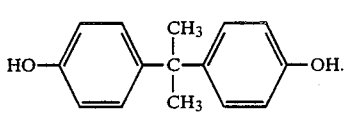

8. A film as claimed in claim 1 wherein the thermoplastic is a homopolycarbonate based on a diphenol.

9. A film as claimed in claim 8 wherein the thermoplastic is a homopolycarbonate based on a bisphenol of the formula:

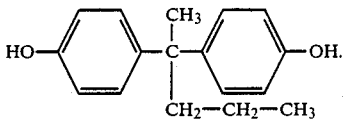

10. A film as claimed in claim 8 wherein the thermoplastic is a homopolycarbonate based on a diphenol of the formula:

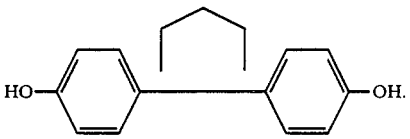

11. A film as claimed in claim 8 wherein the thermoplastic is a homopolycarbonate based on a diphenol of the formula:

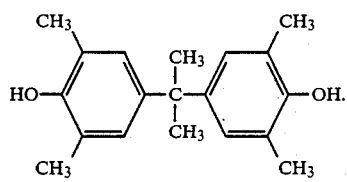
12. A film as claimed in claim 8 wherein the thermoplastic is a homopolycarbonate based on a diphenol of the formula:
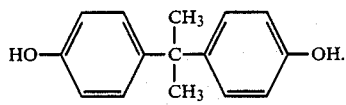
* * * * *

UNITED STATES PATENT AND TRADEMARK OFFICE
CERTIFICATE OF CORRECTION

PATENT NO. : 4,954,569

DATED : September 4, 1990

INVENTOR(S) : Weymans et al.

It is certified that error appears in the above-identified patent and that said Letters Patent is hereby corrected as shown below:

The formula (Ib), which appears at Col. 9, lines 52-59, and in claims 5 and 10, should be corrected to appear as follows:

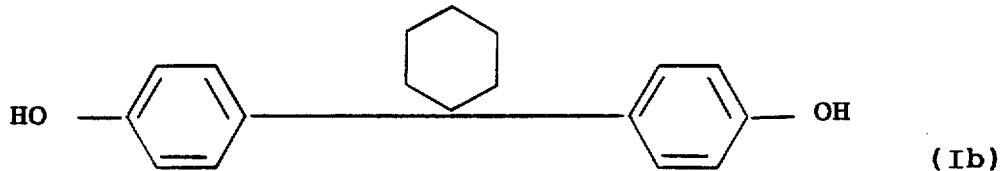

(Ib)

Signed and Sealed this

Seventh Day of January, 1992

*Attest:*

HARRY F. MANBECK, JR.

*Attesting Officer*      *Commissioner of Patents and Trademarks*